April 10, 1956 G. B. STRYKER 2,741,379
METHOD OF CAN TRANSFER
Filed Sept. 4, 1951
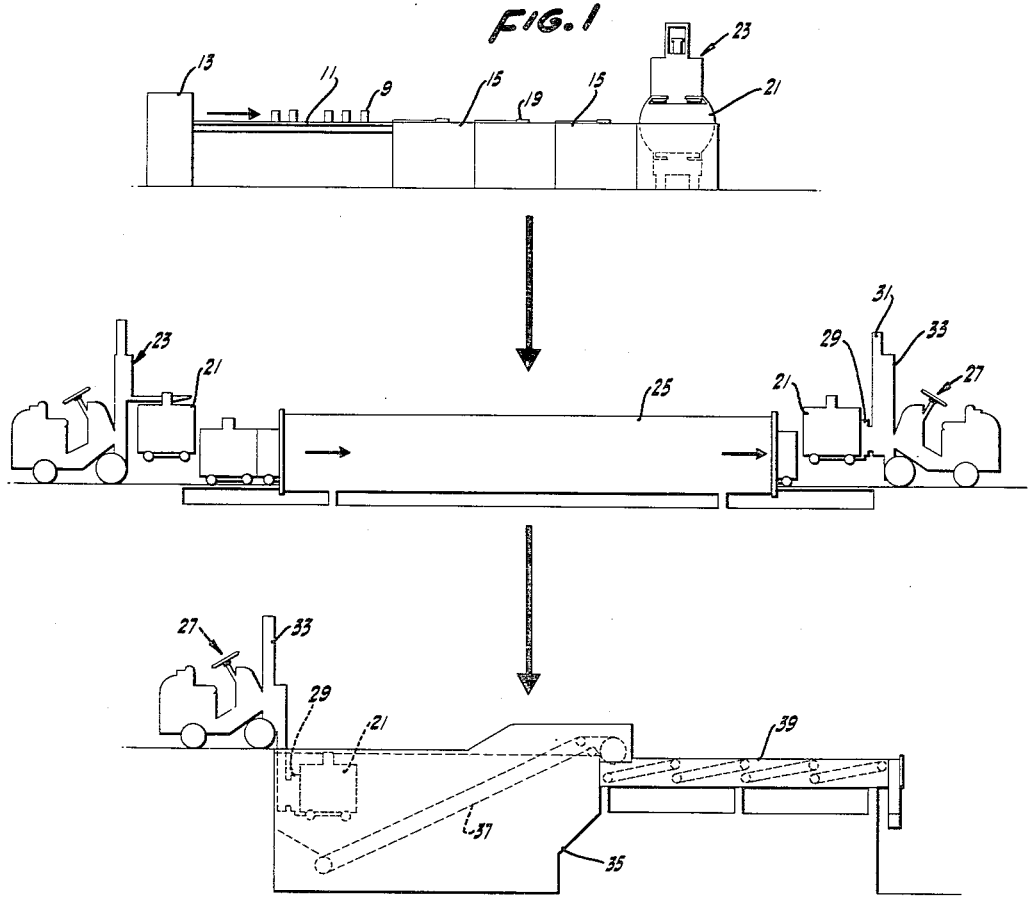
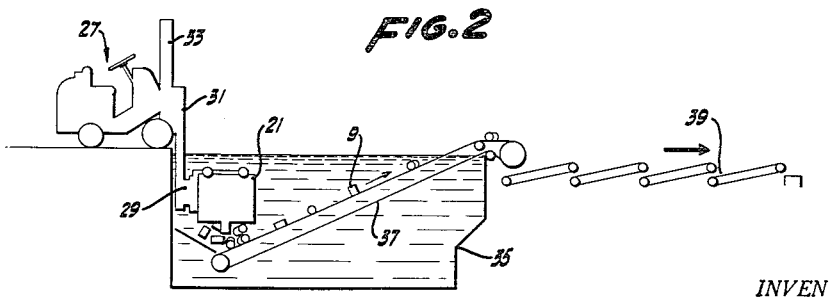
INVENTOR.
GARRETT B. STRYKER
BY
Mellin and Hanscom
ATTORNEYS

United States Patent Office 2,741,379
Patented Apr. 10, 1956

2,741,379

METHOD OF CAN TRANSFER

Garrett B. Stryker, Fullerton, Calif., assignor to Hunt Foods, Inc., Los Angeles, Calif., a corporation of Delaware Application September 4, 1951, Serial No. 244,957

1 Claim. (Cl. 214—152)

This invention relates to a method of emptying receptacles of cans and loading a conveyor with cans without danger of denting the cans. This application is a continuation-in-part application of my prior copending application entitled "System of Can Transfer," Serial No. 61,273, filed November 20, 1948, and now Patent No. 2,640,639.

A main object of the present invention is to provide a new, novel and improved method of emptying receptacles of cans and loading a conveyor with cans without danger of denting the cans.

A more particular object of the present invention is to provide a method of emptying receptacles of cans without danger of denting the cans which comprises the steps of submerging a receptacle loaded with cans in a liquid bath and tilting the basket or receptacle after submergence in order to discharge the cans from the basket.

Another object of the present invention is to provide a method of loading a conveyor with cans which comprises the steps of submerging the conveyor in a liquid bath and delivering cans to the bath at a point above the conveyor, whereby the cans will gravitate to the conveyor, the liquid bath impeding the movement of the cans in order to cushion the impact thereof with the conveyor.

Various other objects of the present invention will be apparent from the following description taken in connection with the accompanying drawings wherein:

Figure 1 is a schematic flow sheet of a can transfer system embodying the concepts of the present invention;

Figure 2 is a view of a portion of the arrangement disclosed in Figure 1 but showing the parts disposed in the positions they assume in a subsequent stage of operation.

Referring to the accompanying drawings wherein similar reference characters designate similar parts throughout, as shown in the flow sheet in Figure 1, cans 9 are fed onto a conveyor 11 from a seamer 13 of a conventional form to a plurality of liquid filled transfer tanks 15 and are deflected into the liquid filled tanks by a suitable unloader 19, such as disclosed in my prior copending application entitled "Retort Basket Loader," Serial No. 61,272, filed November 20, 1948, and received by baskets 21 submerged within the tanks. A fork lift truck 23 elevates the baskets 21 and carries them to a retort 25 wherein the cans are cooked and through which the cans are moved.

The above general steps are not part of the present invention as these steps are covered by my prior co-pending applications above identified.

The present invention concerns the emptying or unloading of cans 9 from a basket 21 without denting the cans. At the same time, it is of importance in the present invention to also be able to load a conveyor with cans without danger of denting the cans.

The cans are then picked up at the discharge end of the retort by a fork lift truck 27. Lift truck 27 has a rotary head 29 mounted on the lower end of a vertically movable carriage 31, which is reciprocable along a guide head 33 fixed to the frame of the truck.

An unloader tank 35, having an inclined conveyor 37, is provided and filled with water, as shown in Figure 2, to submerge the conveyor. Lift truck 27 is run to the edge of the loading tank 35, which is preferably sunken into the floor, and carriage 31 is lowered, with the basket 21 thereon being retained in upright condition, as shown in dotted lines in Figure 1. After the basket is completely submerged, the rotary head 29 is slowly rotated to invert the basket 21 to dump the cans 9 from the basket onto conveyor 37 which conveys the cans to a suitable unscrambler 39 and then to a labeler. The fork lift truck 27 is so operated that the basket 21 is lowered into close proximity to the lower end of conveyor 37 so that when the basket 21 is inverted the cans gravitate through the fluid a relatively short distance and gravitate gently onto the conveyor without denting the cans. The retort basket 21 is perforated or of reticulated construction so that prior to its inversion it is filled with water so that the cans are not knocked against one another during exit from the basket and so that there is little turbulence caused by the dumping operation and consequently the cans are not knocked about when dumped.

After the basket 21 is inverted and the cans are dumped, the basket is rotated to an upright position and removed from the bath and returned to the retort 25 for another basket.

By the present invention, a novel method has been provided whereby cans may be emptied from a basket without danger of denting the cans and also a method has been provided for emptying cans onto a conveyor without denting the same.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A method of transferring cans from a cooking retort to a conveyor without danger of denting the cans, comprising submerging the conveyor in a liquid bath, taking a foraminous basket loaded with cans from the delivery end of the cooking retort and submerging it in the liquid bath, positioning the basket in close proximity to the conveyor, and slowly rotating the basket after submergence to invert the same and discharge the cans therefrom and allow the cans to gravitate through the fluid bath onto the conveyor.

References Cited in the file of this patent

UNITED STATES PATENTS

| | | |
|---|---|---|
| 448,895 | Van Kannel | Mar. 24, 1891 |
| 1,507,864 | Smith | Sept. 9, 1924 |
| 1,744,363 | Chapman | Jan. 21, 1930 |
| 2,540,766 | Stilwell et al. | Feb. 6, 1951 |